(12) United States Patent
Holzberger et al.

(10) Patent No.: US 10,520,067 B2
(45) Date of Patent: Dec. 31, 2019

(54) BELT DRIVE

(71) Applicant: Schaeffler Technologies AG & Co. KG, Herzogenaurach (DE)

(72) Inventors: Markus Holzberger, Emskirchen (DE); Kilian Marsing, Hetzles (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 340 days.

(21) Appl. No.: 15/324,928

(22) PCT Filed: Jun. 12, 2015

(86) PCT No.: PCT/DE2015/200365
§ 371 (c)(1),
(2) Date: Jan. 9, 2017

(87) PCT Pub. No.: WO2016/004940
PCT Pub. Date: Jan. 14, 2016

(65) Prior Publication Data
US 2017/0204944 A1  Jul. 20, 2017

(30) Foreign Application Priority Data
Jul. 7, 2014  (DE) .................. 10 2014 213 141

(51) Int. Cl.
*F16H 7/12* (2006.01)
*F16H 7/02* (2006.01)
(Continued)

(52) U.S. Cl.
CPC ............. *F16H 7/1281* (2013.01); *F16H 7/02* (2013.01); *F16H 25/2204* (2013.01);
(Continued)

(58) Field of Classification Search
CPC ......... F16H 25/2204; F16H 2007/0874; F16H 7/1281; F16H 7/02
(Continued)

(56) References Cited

U.S. PATENT DOCUMENTS 4,564,098 A * 1/1986 Hormann ............... E05F 15/668
                                                        192/150
4,892,508 A * 1/1990 Ryan ....................... B61B 12/06
                                                        105/151
(Continued)

FOREIGN PATENT DOCUMENTS

| CN | 1415508 | 5/2003 |
|---|---|---|
| CN | 101149001 | 3/2008 |

(Continued)

*Primary Examiner* — Michael R Mansen
*Assistant Examiner* — Mark K Buse
(74) *Attorney, Agent, or Firm* — Volpe and Koenig, P.C.

(57) ABSTRACT

A belt drive for driving a rotatably mounted object, includes a main part, at least two belt wheels, a device for generating a pretensioning force, and a continuously circulating belt which loops around the belt wheels. The first belt wheel is connected to or can be connected to a drive, and the second belt wheel is connected to or can be connected to the object. The invention is characterized in that the device has at least two rollers which are attached to opposite sides of a lever that is pivotally mounted on the main part, and each roller contacts a section of the belt, wherein the lever is acted upon by at least one spring element and can be moved relative to the main part.

20 Claims, 3 Drawing Sheets

(51) Int. Cl.
*F16H 25/22* (2006.01)
*F16H 7/08* (2006.01)
*F16H 25/20* (2006.01)

(52) U.S. Cl.
CPC ............... *F16H 2007/0806* (2013.01); *F16H 2007/0808* (2013.01); *F16H 2007/0865* (2013.01); *F16H 2007/0874* (2013.01); *F16H 2007/0893* (2013.01); *F16H 2025/2081* (2013.01); *F16H 2025/2096* (2013.01)

(58) Field of Classification Search
USPC .......................................................... 474/134
See application file for complete search history.

(56) References Cited

U.S. PATENT DOCUMENTS

| | | | | |
|---|---|---|---|---|
| 5,221,236 A * | 6/1993 | Raymer | ............... | B62M 9/16 474/109 |
| 5,957,794 A * | 9/1999 | Kerr | ............... | B62M 9/04 474/111 |
| 6,179,740 B1 * | 1/2001 | Walker | ............... | F16H 7/1254 474/134 |
| 6,743,131 B1 * | 6/2004 | Walker | ............... | F16H 7/08 474/101 |
| 6,837,357 B2 | 1/2005 | Peter | | |
| 7,815,533 B2 | 10/2010 | Vrsek et al. | | |
| 7,896,765 B2 * | 3/2011 | Kuo | ............... | F16H 7/1281 474/134 |
| 8,454,462 B2 * | 6/2013 | Konno | ............... | F16H 7/08 474/111 |
| 2003/0153420 A1 * | 8/2003 | Rogers | ............... | F16H 7/12 474/134 |
| 2003/0224889 A1 * | 12/2003 | Luh | ............... | F16H 7/1281 474/134 |
| 2005/0181901 A1 * | 8/2005 | Shin | ............... | F16H 7/1218 474/134 |
| 2010/0044145 A1 * | 2/2010 | Spengler | ............... | B62D 5/0424 180/444 |
| 2011/0077114 A1 | 3/2011 | Markley | | |

FOREIGN PATENT DOCUMENTS

| | | |
|---|---|---|
| CN | 102027265 | 4/2011 |
| DE | 614688 | 6/1935 |
| DE | 102007042501 | 3/2009 |
| DE | 102011006890 | 10/2012 |
| DE | 102012212730 | 12/2013 |
| FR | 995495 | 12/1951 |
| FR | 2730780 | 8/1996 |
| FR | 2959701 | 11/2011 |

* cited by examiner

BELT DRIVE

BACKGROUND

The invention relates to a belt drive for driving a rotatably mounted object, comprising a base body and at least two belt wheels, a device for generating a pre-tensioning force, and an endlessly circulating belt wrapped around the belt wheels, wherein the first belt wheel is connected or can be connected to a drive and the second belt wheel is connected or can be connected to an object.

Typically, for belt drives, pre-tensioning of the belt and a defined wrap-around angle on the belt wheels is guaranteed by spring-mounted roller elements or by an eccentric connection of the roller elements. This involves complicated constructions that are to be integrated with difficulty into a narrow installation space. Furthermore, such pre-tensioning of the belt can realize only a certain amount of pre-tensioning force and the belt is always loaded with the maximum pre-tensioning force, even at standstill.

SUMMARY

The invention is therefore based on the objective of providing a belt drive that enables a sufficient wrap-around angle without permanently loading the belt by a pre-tensioning force.

To achieve this objective, for a belt drive of the type noted above it is provided according to the invention that the device has at least two rollers that are attached on opposite sides of a lever mounted so that it can pivot on the base body and each contact a section of the belt, wherein the lever is loaded by at least one spring element and can be displaced relative to the base body.

The advantage of the belt drive according to the invention is provided in that the device pre-tensions the belt for generating a pre-tensioning force by its two rollers and defines the wrap-around angle on the two belt wheels. Through the pivoting support of the lever on the base body, as a function of the rotational direction of the first belt wheel that is connected to a drive, the lever rotates in the same direction as the first belt wheel.

Therefore, each of the two rollers arranged on the lever exerts a force on the outside of the belt, which pre-tensions the belt and increase the wrap-around angle on the two belt wheels. Here it is advantageous that the pre-tensioning force acting on the belt is, on one hand, dependent on the rotational direction, that is, is pivoted according to the rotational direction of the first belt wheel of the lever and each roller engages the tensioned belt section or the non-tensioned belt section. If the belt is not driven, the lever assumes a neutral position, so that practically no force is exerted on the belt. Accordingly, the belt is only then loaded by the force that is generated by the device when the belt is also actually driven. Unnecessary loading of the belt during standstill is thus minimized.

The belt drive according to the invention is distinguished in that at least one spring element is supported between the lever and the base body. The lever is here movable with respect to the base body. The spring element exerts a force on the lever so that the device is moved relative to the base body for generating a pre-tensioning force, in order to increase the wrap-around angle on the two belt wheels.

The belt drive according to the invention has a compact construction due to the device integrated in the base body for generating a pre-tensioning force, as well as a spring element, so that no additional installation space is required. Thus, the belt drive according to the invention is an alternative to the belt drives known in the prior art.

One especially advantageous construction of the invention can provide that the base body has a recess in which the rotatably mounted object is mounted or can be mounted. This opening of the base body can be passed through by the object, so that the second belt wheel is connected to the rotatably mounted object. This can be constructed as or connected to, for example, a spindle and the belt wheel can be constructed as or connected to a ball screw nut.

One advantageous refinement of the invention can provide that the lever has a two-part construction, wherein the rollers are held between the two parts. The rollers can be arranged and supported by shafts or pins parallel to the rotational axis of the lever. The shafts or pins of the rollers are held and rotatably mounted between the two parts of the two-part lever. Through this two-part construction of the lever, a stable arrangement of the rollers is guaranteed. This ensures that for a movement of the belt drive, the two rollers are held in a defined position.

The lever, the two rollers, and their shafts or pins can both be produced from plastic and also metal. It can be useful to pay attention to avoiding similar-type material combinations, because this can reduce the formation of noise during the movement of the belt drive.

The pivoting and movable support of the lever on the base body can take place by a pin arranged on the base body. Through this pin, the lever is mounted rotatable and displaceable on the base body. The pin here runs parallel to the shafts or pins of the two rollers and is preferably arranged in the middle between these parts. The position of the pin is thus preferably located in the intersecting point of a line that connects the center points of the two belt wheels with another line that connects the center points of the two rollers. Through this preferred construction, it is achieved that the two rollers are arranged symmetrically. Therefore, none of the two rotational directions are preferred, because the pre-tensioning force generated by the device also acts symmetrically for both rotational directions. If one rotational direction is to be preferred if, for example, an increase pre-tensioning in one rotational direction is useful relative to the other rotational direction, this can be achieved by an asymmetric positioning of the pin or an asymmetric arrangement of the rollers on the lever. The pin of the lever is thus located between the two rollers that contact the outside of the belt. Depending on a rotational direction of the first belt wheel, the lever is pivoted about the pin. Here, one roller spans the tensioned belt section and the other roller spans the non-tensioned belt section. A rotation of the first belt wheel in one direction thus leads to a same-sense rotation of the lever.

So that the device for generating the pre-tensioning force with respect to the base body can be shifted by the spring element, one embodiment of the invention can provide that the lever can be displaced parallel to a line that connects the center points of the two belt wheels. A shifting along this line can be guaranteed by a groove in the base body. Here, the pin of the lever engages in the groove and is guided in this groove. Consequently, the device can be moved along this groove for generating the pre-tensioning force. Here, a force equalization from the spring fore of the spring element and the force applied by the belt on the device for generating the pre-tensioning force is set. Deviating from a groove that is parallel to the line that connects the center points of the two belt wheels, a groove that enables a different movement direction of the device for generating the pre-tensioning force can also be realized. These can be realized according to the application at an angle to the axis and thus can increase the wrap-around angle and the pre-tensioning force on one section of the belt.

One refinement of the belt drive according to the invention can be provided in that the at least one spring element is supported between the lever and the base body. The spring element can here be made from metal or from plastic. The spring element can be constructed as a ring spring, helical spring, spiral spring, as an elastomer or, in particular, by multiple individual spring elements. As a spring element, thus each object can be inserted that guarantees the application of a spring force on the device for generating the pre-tensioning force.

One especially preferred construction of the invention can provide that the first belt wheel and the belt have a wrap-around angle between 120° and 240°, preferably 160° and 200°. In this range, a sufficient force transmission between the belt wheel and belt is guaranteed.

The base body of the belt drive can be formed as a housing according to one especially preferred construction. Through the formation of the base body as at least one partially closed housing it can be prevented that penetrating foreign bodies adversely affect the function of the belt drive. This is thus protected, for example, against dust or other foreign particles. Therefore, soiling of the belt drive and the risk of injury due to contact with the moving parts can be minimized. In addition, an at least partially closed housing can be used for reducing the formation of noise that necessarily is produced when the belt drive is operating. For the formation of the base body as a housing, it can be provided that the pin of the lever is supported in a recess in a cover and/or in a base. The base body can be made independent of the construction from plastic or metal. Accordingly, the pin of the lever can be adapted to the material of the base body or arbitrarily also from plastic or metal. It is also possible to produce the pin as a fixed component of the base body, for example, by a plastic injection molding process, wherein a rotatable support of the lever on the pin must be guaranteed. For fastening a cover element in the construction of the base body as a housing, in the cover element a corresponding recess can be provided for the pin. The recess for the pin must be constructed here corresponding to the recess in the base of the housing such that a movement of the lever along or through the recess or groove in the cover and base of the housing is possible.

The invention also relates to a ball screw drive comprising a spindle, a ball screw nut, and a belt drive according to the invention. The belt drive is used for driving the spindle and the ball screw nut connected to the spindle. The spindle or the ball screw nut is connected to the second belt wheel or the second belt wheel is formed as a ball screw nut. The spindle is connected in turn to the body of the motor vehicle or a component fastened to the body, so that depending on the circulating direction of the first belt wheel and thus the rotational sense of the ball screw nut, the spindle is moved in an axial direction or in the opposite axial direction, preferably upward or downward. In this way, the body can be raised or lowered or the chassis setting can be changed. Instead of constructing the second belt wheel as the ball screw nut and connecting to a spindle guided through the base body through the opening, the second belt wheel can also be connected rigidly to the spindle that is connected in turn to a nut that is mounted stationary on the body of the motor vehicle. In order to guarantee, for belt drives, a highest possible force transmission and a low energy loss between the belt wheels, the belt is pre-tensioned by the device for generating a pre-tensioning force.

BRIEF DESCRIPTION OF THE DRAWINGS

Additional advantages and details of the invention are described using an embodiment under reference to the drawings. The drawings are schematic diagrams and show.

DETAILED DESCRIPTION OF THE PREFERRED EMBODIMENTS

Figure 1:
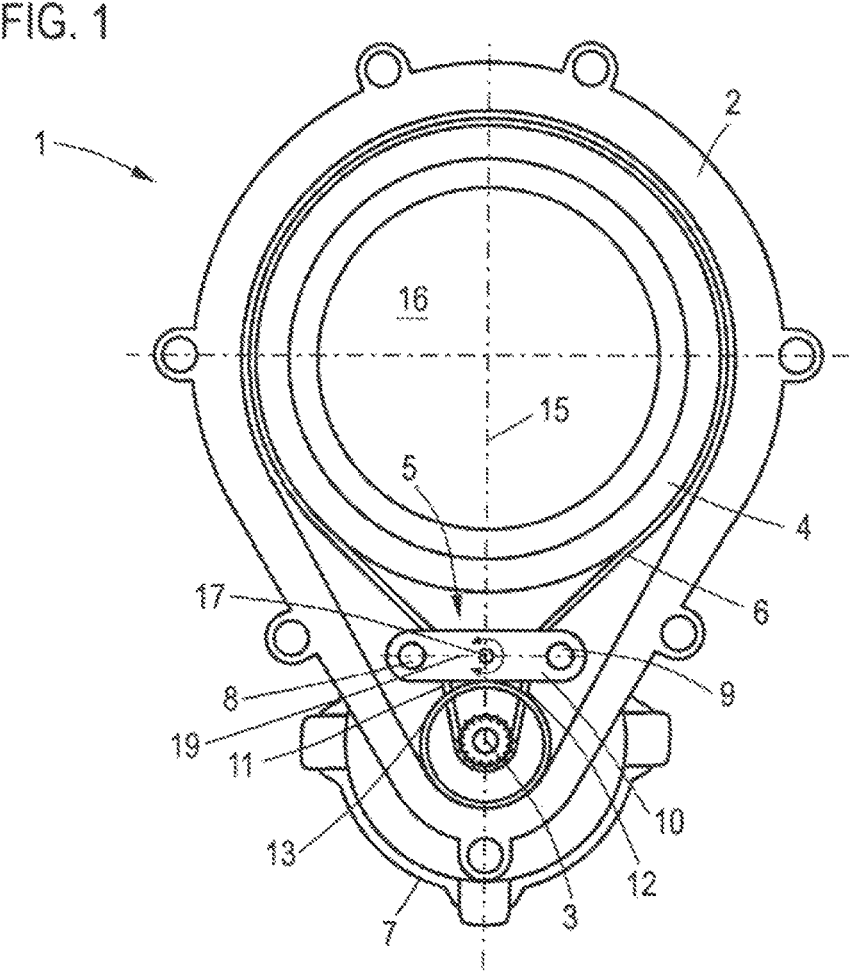
FIG. 1 a top view of a belt drive according to the invention.

FIG. 1 shows a top view of a belt drive 1 for driving a rotatably mounted object, comprising a base body 2 and two belt wheels 3, 4, a device 5 for generating a pre-tensioning force, and an endlessly circulating belt 6 wrapped around the belt wheels 3, 4, wherein the first belt wheel 3 is connected or can be connected to a drive 7 and the second belt wheel 4 is connected or can be connected to the object. The object is not shown for reasons of clarity.

In this embodiment, the device 5 comprises two rollers 8, 9 that are mounted on opposite sides of a lever 10 supported on the base body 2 so that it can be pivoted and displaced and each contact a section 11, 12 of the belt 6, as well as the lever 10. Between the device 5 and the base body 2 there are two spring elements 13, 14. The two spring elements 13, 14 are constructed as ring springs. These support the lever 10 by generating a spring force and thus support the device 5 for generating the pre-tensioning force against the base body 2. Therefore, the device 5 is shifted in the form of the two rollers 8, 9 along the line 15 that connects the center points of the two belt wheels 3, 4 in the direction of the center points of the second belt wheel 4.

The base body 2 is constructed as a housing; in this embodiment, it is made from plastic. Coaxial to the center point of the second belt wheel 4 there is an opening 16 in which an object can be inserted in order to connect this object to the second belt wheel 4. The object can be, e.g., a threaded rod or a ball screw nut of a spindle drive.

In this embodiment, the first belt wheel 3 is constructed as a drive pinion. It is connected to the drive 7 that is constructed as an electric motor. The center points of the two belt wheels 3, 4 are on the common line 15. In addition, the endlessly circulating belt 6 is shown that wraps around the two belt wheels 3, 4. The device 5 that comprises the two rollers 8, 9 and the lever 10 also has a pin 17 that is connected to the base body 2 and forms the rotational axis 18 of the device 5. This lies in the intersection point of the line 15 with the line 19 that connects the center points of the rollers 8, 9 to each other.

Figure 2:
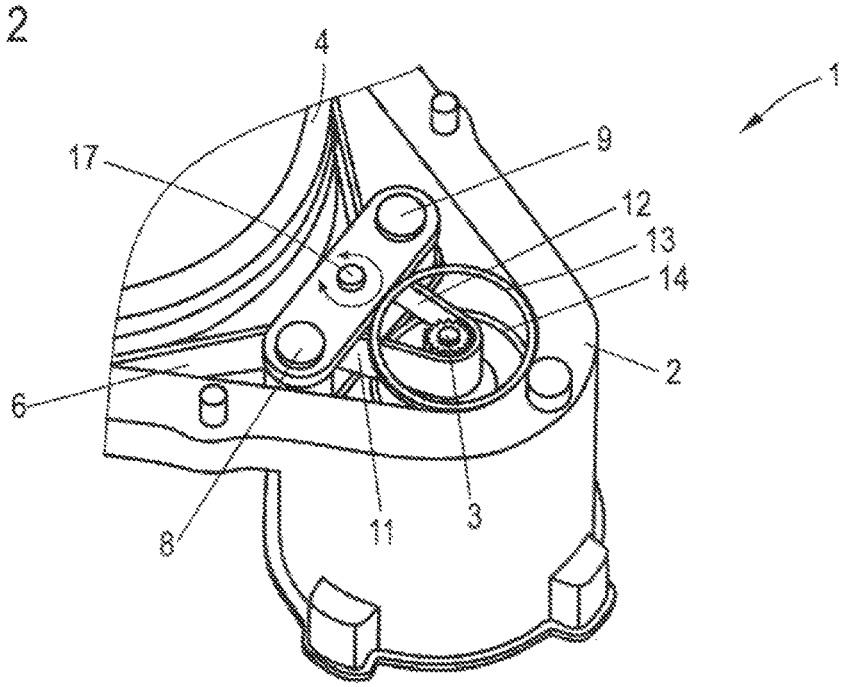
FIG. 2 a perspective detailed view of the belt drive according to the invention of FIG. 1 in the area of a spring element, FIG. 3 the base body of the belt drive according to the invention of FIG. 2, FIG. 4 the lever of the belt drive of FIG. 1, FIG. 5 a top view of a detail of the belt drive according to the invention of FIG. 1 for driving in the clockwise direction, and FIG. 6 a top view of the belt drive according to the invention of FIG. 1 for driving in the counterclockwise direction.

In FIG. 2, a detail of the belt drive of FIG. 1 is shown in the area of the first belt wheel 3. It can be seen that the two rollers 8, 9 contact the belt 6 at the opposing belt sections 11, 12. One can see the two-part construction of the lever 10, whose two halves are connected by the pin 17 and the rollers 8, 9. The pin 17 has a circular cross section and is thus used for the rotatable support of the lever 10. For the driven first belt wheel 3, a rotation of the lever 10 is thus realized. Between the two parts of the lever 10 there are the rollers 8, 9 that contact the belt 6 wrapped around the first belt wheel 3 on its outside. In addition, the spring elements 13, 14 are shown, which are arranged approximately coaxial to the first belt wheel 3. The two spring elements 13, 14 support the base body 2 against the two parts of the lever 10. Optionally, a groove can be provided in the base body and/or the two parts of the lever, so that the spring elements can engage therein, wherein the spring elements 13, 14 are secured.

Figure 3:
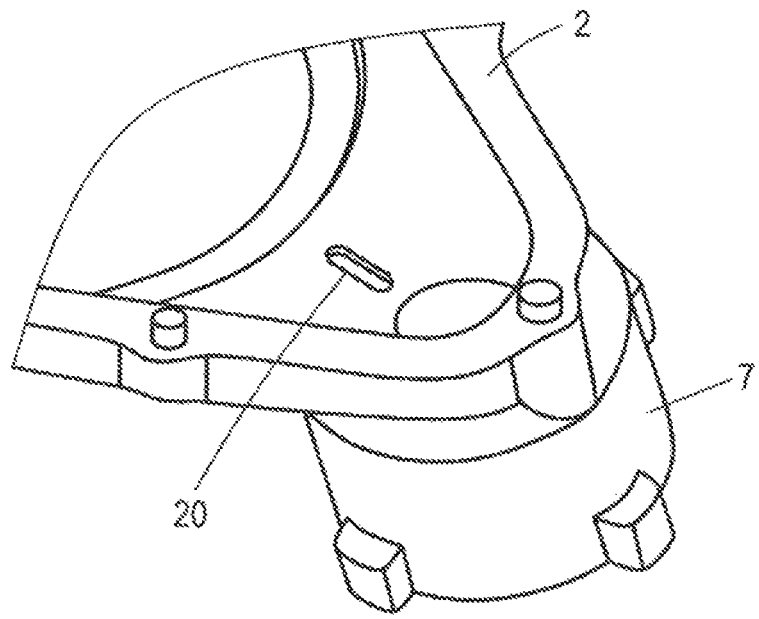

In FIG. 3, the base body 2 of FIG. 2 is shown separately, so that the groove 20 can be seen in which the pin 17 engages. The pin 17 can be moved along this groove 20 by the forces acting on the device 5 by the belt 6, the two rollers 8, 9, and the spring elements 13, 14. This guarantees a stable guidance of the pin 17 and thus of the entire device 5.

Figure 4:
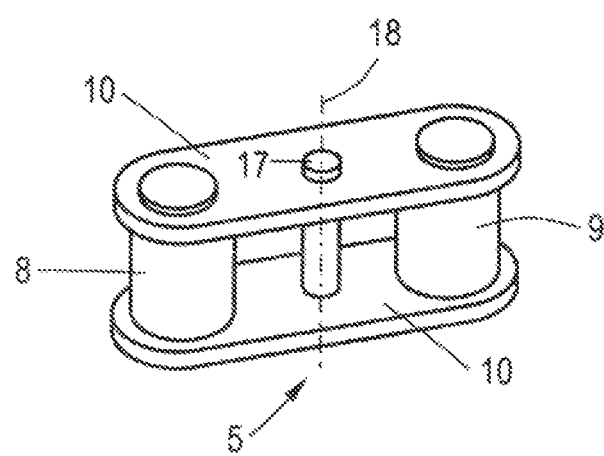

In FIG. 4, the device 5 for generating the pre-tensioning force is shown. In this perspective view, the two-part construction of the lever 10 and the arrangement of the two rollers 8, 9 can be seen. According to a rotation of the first belt wheel 3, the device 5 pivots about the rotational axis 18 that coincides with the axis of the pin 17.

Figure 5:
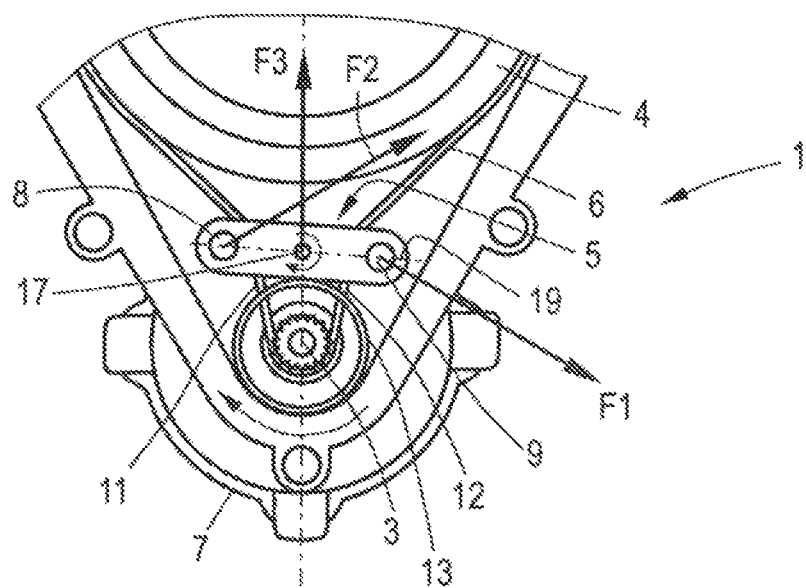
Figure 6:
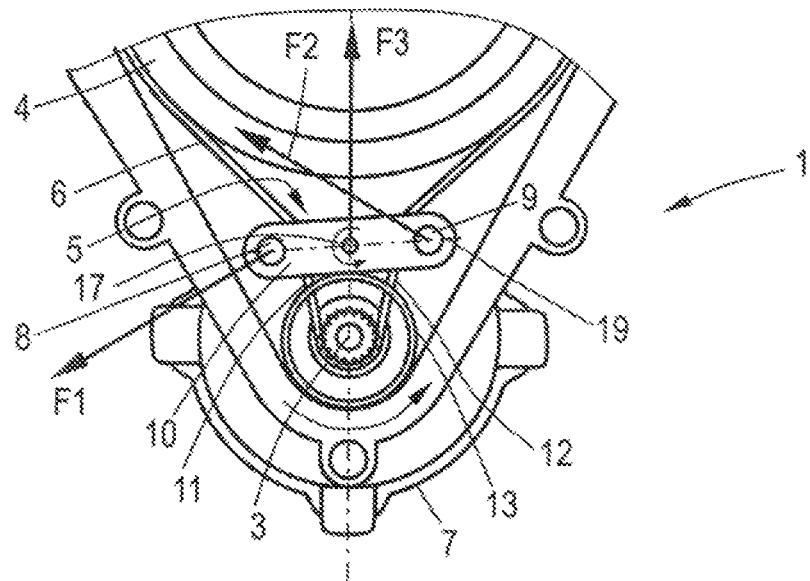

The two possible rotational directions of the first belt wheel 3 are shown in FIGS. 5 and 6 that show the belt drive 1 of FIG. 1 in the area of the device 5.

In the situation shown in FIG. 5, the first belt wheel 3 that is formed as a drive pinion is driven by the drive 7 such that it carries out a motion in the clockwise direction. Through this motion, the belt section 12 becomes the tensioned belt section and the belt section 11 becomes the non-tensioned belt section. Due to this motion, the device 5 is also moved to rotate in the clockwise direction by its rollers 8, 9. The belt section 12 thus exerts a force F1 on the roller 9 applied to it and thus causes a pivoting of the lever 10. The force F1 acts approximately perpendicular to the belt 6. Through this rotation of the lever 10, the force F1 is transmitted in the form of a force F2 by the opposite roller 8 onto the belt section 11. In this way, an increase of the wrap-around angle and a pre-tensioning of the belt 6 is achieved. The spring elements 13, 14 here generate a spring force F3 that acts along the line 15. F3 has the effect that the device 5 is pressed in the direction of the belt wheel 4. Therefore, the wrap-around angle and the pre-tensioning of the belt 6 increase. By changing the spring element 13, 14 through selection of suitable spring stiffness values, a matching spring force and thus a desired pre-tensioning force acting on the belt 6 are guaranteed.

If the first belt wheel 3 is not further driven, the device 5 moves back into a neutral position or starting position that is shown in FIG. 1. In this way, the belt 6 is not loaded by a pre-tensioning force in the load-free state.

If the rotational direction of the first belt wheel 3 in FIG. 5 is reversed by the drive 7, then the state shown in FIG. 6 is set. The first belt wheel 3 is here rotated in the counter-clockwise direction, wherein the belt section 11 becomes the tensioned belt section and the belt section 12 becomes the non-tensioned belt section. Accordingly, a force F1 now acts on the roller 8 contacting the belt section 11. This force is transmitted via the lever 10 to the opposite roller 9 that engages on the belt section 12, and spans this roller. It is thus guaranteed that an increase of the wrap-around angle and a pre-tensioning force acting on the belt 6 is generated as a function of the rotational direction of the first belt wheel 3, which, in contrast, at standstill, does not load the belt 6 in the load-free state of the belt drive 1. The device 5 is thus an automatic belt tensioner. The spring elements 13, 14 here have the effect, through the applied spring force F3, to further increase the wrap-around angle and increase the force that the rollers 8, 9 exert on the belt 6, wherein the forces F1 and F2 that pre-tension the belt 6 are also increased indirectly.

LIST OF REFERENCE NUMBERS

1 Belt drive
2 Base body
3 Belt wheel
4 Belt wheel
5 Device
6 Belt
7 Drive
8 Roller
9 Roller
10 Lever
11 Belt section
12 Belt section
13 Spring element
14 Spring element
15 Line
16 Opening
17 Pin
18 Rotational axis
19 Line
20 Groove
F1 Force
F2 Force
F3 Force

The invention claimed is:

1. A belt drive comprising:
a base body and a first belt wheel and a second belt wheel, the first belt wheel being connected or connectable to a drive, and the first belt wheel and the second belt wheel each being rotationally supported about a respective rotational axis,
an endlessly circulating belt wrapped around the first belt wheel and the second belt wheel,
a lever pivotably supported about a pivot axis on the base body by a pin, and
at least two rollers mounted on opposite sides of the lever, each of the at least two rollers contacting a respective section of the belt,
the lever is loaded by at least one spring element,
the pivot axis of the lever is positioned between the rotational axis of each of the first belt wheel and the second belt wheel,
the pin is displaceable such that the lever is both rotatable and displaceable, and
a centerline extends through center points of the first belt wheel and the second belt wheel, and the pin is displaceable along the centerline.

2. The belt drive according to claim 1, wherein the base body includes an opening.

3. The belt drive according to claim 1, wherein the lever has a two-part construction including two links that are axially spaced from each other along the pivot axis, and the rollers and the pin are axially held between the two links.

4. The belt drive according to claim 1, wherein the at least one spring element is supported between the lever and the base body.

5. The belt drive according to claim 1, wherein the first belt wheel and the belt have a wrap-around angle between 120° and 240°.

6. The belt drive according to claim 1, wherein a rotation of the first belt wheel leads in one direction to a same rotational direction of the lever.

7. The belt drive according to claim 1, wherein a belt section forming a tensioned belt section over a corresponding one of the rollers moves the lever and therefore an opposite one of the rollers spans a belt section forming a non-tensioned belt section.

8. The belt drive according to claim 1, wherein a groove is defined in the base body, and the pin is engaged within the groove such that the pin is slidable within the groove.

9. The belt drive according to claim 1, wherein a centerline extends through center points of the first belt wheel and the second belt wheel, and a groove is defined in the base body and oriented along the centerline.

10. The belt drive according to claim 1, wherein the pivot axis is arranged along a centerline extending between center points of the first belt wheel and the second belt wheel.

11. A belt drive comprising:
a base body and a first belt wheel and a second belt wheel, the first belt wheel being connected or connectable to a drive, and the first belt wheel and the second belt wheel each being rotationally supported about a respective rotational axis,
an endlessly circulating belt wrapped around the first belt wheel and the second belt wheel,
a lever pivotably supported about a pivot axis on the base body by a pin, and
at least two rollers mounted on opposite sides of the lever, each of the at least two rollers contacting a respective section of the belt,
the lever is loaded by at least one spring element, the pivot axis of the lever is positioned between the rotational axis of each of the first belt wheel and the second belt wheel, the pin is displaceable such that the lever is both rotatable and displaceable, and
the lever has a two-part construction including two links that are axially spaced from each other along the pivot axis, and the rollers and the pin are axially held between the two links.

12. The belt drive according to claim 11, wherein the at least one spring element is supported between the lever and the base body.

13. The belt drive according to claim 11, wherein the first belt wheel and the belt have a wrap-around angle between 120° and 240°.

14. The belt drive according to claim 11, wherein a rotation of the first belt wheel leads in one direction to a same rotational direction of the lever.

15. The belt drive according to claim 11, wherein a belt section forming a tensioned belt section over a corresponding one of the rollers moves the lever and therefore an opposite one of the rollers spans a belt section forming a non-tensioned belt section.

16. A belt drive comprising:
a base body and a first belt wheel and a second belt wheel, the first belt wheel being connected or connectable to a drive, and the first belt wheel and the second belt wheel each being rotationally supported about a respective rotational axis,
an endlessly circulating belt wrapped around the first belt wheel and the second belt wheel,
a lever pivotably supported about a pivot axis on the base body by a pin, and
at least two rollers mounted on opposite sides of the lever, each of the at least two rollers contacting a respective section of the belt,
the lever is loaded by at least one spring element, the pivot axis of the lever is positioned between the rotational axis of each of the first belt wheel and the second belt wheel, the pin is displaceable such that the lever is both rotatable and displaceable, and
a groove is defined in the base body, and the pin is engaged within the groove such that the pin is slidable within the groove.

17. The belt drive according to claim 16, wherein the at least one spring element is supported between the lever and the base body.

18. The belt drive according to claim 16, wherein the first belt wheel and the belt have a wrap-around angle between 120° and 240°.

19. The belt drive according to claim 16, wherein a rotation of the first belt wheel leads in one direction to a same rotational direction of the lever.

20. The belt drive according to claim 16, wherein a belt section forming a tensioned belt section over a corresponding one of the rollers moves the lever and therefore an opposite one of the rollers spans a belt section forming a non-tensioned belt section.

* * * * *